United States Patent Office 2,974,007
Patented Mar. 7, 1961

2,974,007
PROCESS FOR THE RECOVERY OF NIOBIUM AND/OR TANTALUM FROM MIXTURES OF THEIR PENTAHALIDES

Walter Scheller, Neuewelt, near Basel, Switzerland, assignor to Ciba Limited, Basel, Switzerland No Drawing. Filed Nov. 8, 1957, Ser. No. 695,213

Claims priority, application Switzerland Nov. 13, 1956

14 Claims. (Cl. 23—21)

This invention provides a process for the recovery of the anhydrous halides of niobium and tantalum from mixtures of their pentahalides, in which a relatively pure tantalum fraction or niobium fraction is obtained and the residual material has a relatively large concentration of the other element.

In the process of this invention the mixture of pentahalides, especially a mixture of niobium pentachloride and tantalum pentachloride, is reacted with a metal halide capable of forming a double salt with tantalum pentachloride, and the tantalum-containing double salt so formed is separated from a fraction enriched in niobium.

The mixture of the pentahalides of niobium and tantalum used as starting material can be obtained by methods in themselves known. Thus, for example, the mixture may be obtained by the chlorination of a material which contains niobium and tantalum in oxidised form, for example, a slag or especially a concentrate or ore, which may have been after-treated to enrich it in the aforesaid elements, or a mixture of the oxides of these two metals, with chlorine gas and a reducing agent, such as carbon. For this purpose an ordinary industrially available mixture of the oxides of niobium and tantalum or a natural product which contains these two elements generally in the form of their oxides, may be made into briquettes with carbon, and the briquettes treated with chlorine gas at 400–1000° C. in a shaft furnace or tubular furnace. The chlorination products so obtained, which may contain considerable amounts of niobium oxychloride, may be subjected to further chlorination with chlorine gas in the presence of carbon, in order completely to convert the oxychlorides into pentachlorides. The greater part of the chlorides of elements, other than niobium and tantalum, also formed during the chlorination compounds of which elements are usually present as impurities, for example, the chlorides of titanium, tin, manganese etc., may be removed, for example, by so adjusting the temperature in the chlorination zone and the zone in which the vapours of the chlorides of niobium and tantalum are condensed that the chlorides of the accompanying elements, whose boiling or volatilization points are generally widely different from those of the chlorides of niobium and tantalum, are separated to a considerable extent from the latter chlorides.

As metal halides which are capable of forming double salts with tantalum pentachloride there may be mentioned besides thallium halides primarily the halides of alkali metals and alkaline earth metals, and advantageously lithium halides or those alkali metal chlorides and alkaline earth metal chlorides whose metal ions have a diameter greater than the sodium ion. Especially advantageous is anhydrous potassium chloride.

The reaction of the mixtures of the pentahalides of niobium and tantalum with the halides of alkali metals or alkaline earth metals to obtain the tantalum-containing double salts that are stable at low temperatures, that is to say at temperatures up to about 500° C., may be carried out under superatmospheric or atmospheric pressure. The reaction is advantageously carried out with the exclusion of moisture in an inert atmosphere, for example, under nitrogen or carbon dioxide. The reaction must, of course, be carried out at a temperature below the decomposition temperature of the double salt formed, that is to say, at a temperature below about 500° C. The speed of the reaction is fairly high at temperatures above about 300° C. It is possible to work at temperatures above 500° C., that is to say up to about 900° C., if the reaction is carried out under superatmospheric pressure, so that the decomposition temperature of the double salt is correspondingly raised. Thus, the pentachloride mixture may be reacted in an apparatus, which may have been previously evacuated, with finely powdered dry potassium chloride, which may be diluted with an inert solid diluent such as carbon, and advantageously while mechanically moving the mixture. Instead of potassium chloride, there may be used a mixture of potassium chloride with its double salt with niobium or tantalum pentachloride, which mixture advantageously has a content of potassium chloride corresponding to the quantity of niobium or tantalum pentachloride present in the mixture of pentachlorides, respectively.

The pentachlorides of niobium and tantalum diluted with an inert carrier gas, such as nitrogen, may be reacted at 300–500° C. with potassium chloride in a shaft furnace or tubular furnace which contains the potassium chloride alone or diluted with an inert solid carrier. It is of advantage to circulate the waste gases from the chlorination reaction repeatedly over the potassium chloride in order to bring into reaction as much as possible of the tantalum pentachloride remaining in the waste gases.

The chemistry of the reaction leading to the formation of the double salt may probably be explained in that, at first both potassium chloride double salts are formed, namely the double salt of niobium pentachloride and the double salt of tantalum pentachloride. The tantalum pentachloride double salts however are usually more stable than the corresponding niobium double salts, which entails the possibility of separating the niobium and tantalum fractions.

Instead of carrying out the reaction to form the double salts between gaseous and solid components, it may be carried out between liquid and solid components. For this purpose, for example, anhydrous potassium chloride may be treated with the molten pentachlorides or treated with the pentachlorides in the presence of an inert solvent.

The fact that the double salts of tantalum pentachloride with halides of alkali metals or alkaline earth metals are more stable than those of niobium pentachloride can be utilized for refining the niobium pentachloride by means of chromatographic adsorption. As the adsorption column, there is used a column of a powdered halide of an alkali metal or alkaline earth metal in anhydrous form.

As solvents for the pentachlorides there are used anhydrous solvents which do not react with the pentachlorides or react only to form solvates, and especially thionyl chloride, sulfur monochloride, sulfur dichloride, sulfuryl chloride or ethyl bromide. In order to remove the tantalum as completely as possible, it is of advantage to run the various eluates from the chromatographic separation repeatedly through the column, so that a progressively purer niobium fraction is obtained and the tantalum is retained in the column as the double salt.

In order to form the double salt there is used at least one molecular proportion of alkali metal halide or $\frac{2}{3}$ molecular proportion of alkaline earth metal halide for every molecular proportion of tantalum pentahalide present in the mixture.

The separation of the tantalum-containing double salt from the niobium-rich fraction offers no special difficulty, If the formation of the double salt is carried out by reaction between vapour and solid phases, the double salt remains behind as solid residue, and the vapour phase is enriched with niobium pentachloride. If the formation of the double salt is carried out by reaction in the liquid phase, for example, by chromatography through a column of solid potassium fluoride, the niobium pentahalide can be recovered by thermal decomposition of the reaction product which remains after distilling off the solvent, and the higher melting tantalum-containing double salt, which remains in the column, can be recovered therefrom in a similar manner.

For the purpose of regenerating the tantalum pentahalide from the double salt so formed, the double salt may be subjected to thermal decomposition at a temperature above 500° C., and advantageously at a temperature within the range of 550–800° C., whereby the halide is obtained as a sublimate. The thermal decomposition of the double salt may also be carried out under reduced pressure. By using two "moving beds," one bed being maintained, for example, at a temperature within the range of 280–500° C. for double salt formation and the other bed, for example, at a temperature within the range of 550–800° C., for thermally decomposing the double salt, the process can be carried out in a continuous manner, so that there is obtained, on the one hand, a fraction enriched in niobium and, on the other, a tantalum pentahalide. By applying the potassium chloride to an inert solid carrier material or by diluting the potassium chloride with such a material, for example, carbon, the risk of caking can be avoided.

The alkali metal halide or alkaline earth metal halide which remains behind after the thermal decomposition of the double salt can be reused directly in the process. Thus, the practically pure or highly enriched pentahalides can be recovered from the mixture of halides in a cyclic process, and it is only necessary to supply to the process the quantities of niobium and tantalum halides consumed and, when necessary, to replace any loss of alkali metal halide, or alkaline earth metal halide and, when the separation is carried out by subjecting a solution to chromatography, to make good any deficiency of solvent.

In order further to purify the pentahalides of niobium and tantalum obtained by the process they may be distilled or sublimed. However, the halides obtained by the sublimation which accompanies the thermal decomposition of the double salts are usually so highly enriched that they are sufficiently pure for many industrial uses.

The process of the present invention is especially advantageous for the purification of niobium pentachloride.

The following examples illustrate the invention:

*Example 1*

A mixture of niobium pentachloride and tantalum pentachloride, which contained 36.5% of niobium calculated as $Nb_2O_5$ and 63.5% of tantalum calculated as $Ta_2O_5$, was passed in a current of dry nitrogen through a layer about 40 cm. long of dry granular potassium chloride. The potassium chloride was maintained at 300° C.

The sublimate condensed from the gaseous mixture leaving the potassium chloride layer contained 92.0% of niobium calculated as $Nb_2O_5$ and 8.0% of tantalum calculated as $Ta_2O_5$. In a series of experiments the change in composition of the sublimate at progressively higher temperatures within the absorption layer of potassium chloride was determined, and the results are given in the following table:

| Temperature of the KCl | 350° C. | 400° C. | 450° C. | 500° C. |
| --- | --- | --- | --- | --- |
| Composition of the sublimate: | | | | |
| Percent $Nb_2O_5$ | 87.1 | 73.5 | 49.0 | 36.5 |
| Percent $Ta_2O_5$ | 12.9 | 26.5 | 51.0 | 63.5 |

*Example 2*

A distilled mixture of niobium and tantalum pentachlorides, consisting of 4.2 grams of niobium pentachloride and 0.64 gram of tantalum pentachloride (which corresponds to 83.8% $Nb_2O_5$ and 16.2% of $Ta_2O_5$) was dissolved in 200 grams of thionyl chloride, and the solution was filtered in an inert dry atmosphere. The solution was run through a column of potassium fluoride.

The absoption column consisted of a layer 45 cm. high of finely pulverised anhydrous potassium fluoride having a diameter of 2 cm., and the column was conditioned with thionyl chloride.

The solution of pentachlorides was passed through the column four times at the rate of about 200 ml. per hour.

10 ml. of each solution that ran through the column was removed, the thionyl chloride was evaporated and the residue converted into oxides by ammoniacal hydrolysis. After the fourth passage through the column it was washed with 200 grams of fresh thionyl chloride.

In the following table are given the proportions of pentachlorides present in the solution after each passage, which were measured by spectographic methods, and also in the thionyl chloride used for washing the column, the quantities of pentachlorides being calculated as oxides.

| | Percent $Nb_2O_5$ | Percent $Ta_2O_5$ |
| --- | --- | --- |
| Initial mixture | 83.8 | 16.2 |
| After first passage | 96.6 | 3.1 |
| After second passage | 98.9 | 1.1 |
| After third passage | 99.3 | 0.7 |
| After fourth passage | 99.9 | 0.1 |
| Washing liquid | 99.9 | 0.1 |

It will be seen that the tantalum is preferentially absorbed on the potassium fluoride. After evaporating the thionyl chloride from the eluates the residue consisted mainly of the potassium fluoride double salt of niobium pentachloride. By heating the double salt in an inert atmosphere at 550–800° C. there could be obtained niobium pentachloride substantially free from tantalum or $NbCl_3F_2$.

*Example 3*

27 parts by weight of niobium pentachloride, 21 parts by weight of tantalum chloride and 3.75 parts by weight of potassium fluoride were heated for 2½ hours under reflux. Then all products volatile up to about 300° C. were driven off without the use of a fractionating attachment. There were obtained 25.3 parts of distillate, and 26.33 parts of a yellow melt remain behind as residue. The results given in the following table show that the potassium fluoride reacted preferentially with tantalum pentachloride to form a double salt and that the niobium pentachloride became enriched in the distillate.

| | Percent $Nb_2O_5$ | Percent $Ta_2O_5$ |
| --- | --- | --- |
| Composition of starting material | 50.7 | 49.3 |
| Composition of distillate | 81.5 | 18.5 |
| Distillation residue | 22.0 | 78.0 |

What is claimed is:

1. A process for the separation of niobium and tantalum values from mixtures of their pentachlorides comprising the steps of reacting under anhydrous and oxygen-free conditions a mixture of such pentachlorides with a metal halide, the metal being a member selected from the group consisting of an alkali metal and an alkaline earth metal and said metal ion having a diameter larger than that of the sodium ion, and thereby selectively forming a double salt with the tantalum pentachloride fraction, and separating the tantalum-containing double salt from the mixture thereby enriched in niobium.

2. A process for the separation of niobium and tantalum values from mixtures of their pentachlorides comprising the steps of reacting under anhydrous and oxygen-free conditions a mixture of such pentachlorides with a metal halide selected from the group consisting of potassium chloride and potassium fluoride, thereby selectively forming a double salt with the tantalum pentachloride fraction, and separating the tantalum-containing double salt from the mixture thereby enriched in niobium.

3. A process as claimed in claim 2 wherein the formation of the double salt is carried out under superatmospheric pressure and below the decomposition temperature of the double salt under the pressure used.

4. A process as claimed in claim 1 wherein the reaction is carried out batch-wise and at least one molecular proportion of the alkali metal halide is added for every molecular proportion of tantalum pentachloride present in the mixture of pentachlorides.

5. A process as claimed in claim 1 wherein the reaction is carried out batch-wise and at least 2/5 molecular proportion of alkaline earth metal halide is added for every molecular proportion of tantalum pentachloride present in the mixture of pentachlorides.

6. A process as claimed in claim 2, wherein the formation of the double salt is carried out at a temperature not exceeding 500° C.

7. A process as claimed in claim 6, wherein the formation of the double salt is carried out under atmospheric pressure within the range of 300°° C. to 500° C.

8. A process as claimed in claim 2, wherein the double salt is formed by reacting the pentachloride vapour with solid potassium chloride.

9. A process as claimed in claim 8, wherein the pentachloride vapour is diluted with an inert gas.

10. A process according to claim 9 wherein the inert gas is nitrogen.

11. A process for the separation of niobium and tantalum values from mixtures of their pentachlorides comprising the steps of reacting under anhydrous and oxygen-free conditions a mixture of such pentachlorides with a metal halide selected from the group consisting of potassium chloride and potassium fluoride, thereby selectively forming a double salt with the tantalum pentachloride fraction, separating the tantalum-containing double salt from the mixture thereby enriched in niobium, and heating the tantalum-containing double salt to a temperature within the range of 550°–800° C. in order to regenerate the tantalum pentachloride.

12. A process for the recovery of a highly concentrated niobium fraction from a mixture of the pentachlorides of niobium and tantalum comprising contacting a solution of said mixture in an inert solvent with an anhydrous solid halide selected from the group consisting of alkali metal halides and alkaline earth metal halides, and separating the resulting solution from the solid halide.

13. A process as claimed in claim 12 wherein thionylchloride is the inert solvent.

14. A process for the separation of niobium and tantalum values from mixtures of their pentachlorides comprising the steps of reacting under anhydrous and oxygen-free conditions a mixture of such pentachlorides with potassium fluoride, thereby selectively forming a double salt with the tantalum pentachloride fraction, and separating the tantalum-containing double salt from the mixture thereby enriched in niobium.

References Cited in the file of this patent

UNITED STATES PATENTS 2,816,816    Jackson et al.    Dec. 17, 1957

OTHER REFERENCES

Thorpe: "Dictionary of Applied Chemistry," 4th ed., vol. III, pp. 310–311, published by Longmans, Green and Co. N.Y., 1939.

Friend: "Textbook of Inorganic Chemistry," vol. VI, part III, pp. 128, 129, 188, published by Charles Griffin & Co., Ltd., London, England, 1929.

Williams: "An Introduction to Chromatography," pp. 2, 4, 5, published by Chemical Pub. Co., N.Y., 1947.